United States Patent [19]

Kumagai

[11] Patent Number: 4,742,408
[45] Date of Patent: May 3, 1988

[54] DRIVE PIN HOLDING SPRING FOR FLOPPY DISK DRIVE

[75] Inventor: Takeshi Kumagai, Kakuda, Japan

[73] Assignee: Alps Electric Co., Ltd., Japan

[21] Appl. No.: 870,020

[22] Filed: Jun. 3, 1986

[30] Foreign Application Priority Data

Jun. 3, 1985 [JP] Japan .............................. 60-82485[U]

[51] Int. Cl.⁴ ............................................. G11B 5/012
[52] U.S. Cl. ........................................ 360/99; 360/97; 369/270
[58] Field of Search ........................... 360/97, 99, 133; 369/270-271, 282, 261

[56] References Cited

U.S. PATENT DOCUMENTS

| | | | |
|---|---|---|---|
| 4,390,979 | 5/1983 | Saito et al. | 369/270 |
| 4,445,157 | 4/1984 | Takahashi | 360/133 |
| 4,613,921 | 9/1986 | Holmes | 360/133 |
| 4,680,655 | 5/1987 | Sugawara | 360/99 X |
| 4,697,216 | 9/1987 | Tsukahara | 360/133 |

FOREIGN PATENT DOCUMENTS

| | | | |
|---|---|---|---|
| 0062421 | 5/1977 | Japan . | |
| 0087677 | 5/1984 | Japan . | |
| 0256982 | 12/1985 | Japan | 360/133 |

Primary Examiner—John H. Wolff
Assistant Examiner—David J. Severin
Attorney, Agent, or Firm—Guy W. Shoup

[57] ABSTRACT

A floppy disk drive including a disk drive motor having an output shaft, a turntable secured to the output shaft of the motor and having a hole, a spring member attached to the bottom of the turntable, and a disk drive pin provided on the spring member for transmitting the rotation of the motor to a floppy disk on the turntable and having an upper end projecting above the top of the turntable through its hole for engaging the floppy disk. The spring member has a portion to which the drive pin is attached, and which allows the drive pin to incline both radially and circumferentially of a hub on the floppy disk when the hub acts on the drive pin.

1 Claim, 7 Drawing Sheets

DRIVE PIN HOLDING SPRING FOR FLOPPY DISK DRIVE

BACKGROUND OF THE INVENTION

1. Field of the Invention

This invention relates to a floppy disk drive, and more particularly, to a spring member attached to a turntable for rotating a floppy disk.

2. Description of the Prior Art

One of the most important things to be done for a floppy disk drive is to improve it so that it may enable a high accuracy of data recording or reproduction in or from a floppy disk. The known floppy disk drives are mainly of the direct drive type in which a turntable is connected to the output shaft of a disk drive motor for driving a floppy disk directly without employing any belt or other power transmission mechanism.

A typical device of the direct drive type is shown in FIGS. 5 to 7. It comprises a disk drive motor 1 having an output shaft 2, a turntable 3 attached to the free end of the output shaft 2, and a pulse generator 4 for detecting the phase of the turntable 3.

The motor 1 comprises a rotor 5 and a stator 6. The output shaft 2 is secured to the center of the rotor 5 and rotatably supported by bearings 7 in the stator 6 to thereby connect the rotor 5 to the stator 6. The rotor 5 comprises a circular dish-shaped rotor yoke 8 formed from a soft magnetic material, and an annular rotor magnet 9 secured to the inside of the yoke 8 and having a plurality of circumferentially equally spaced apart magnetized portions. The stator 6 comprises a stator yoke 10 formed from a soft magnetic material, and a plurality of drive coils 11 disposed in a circular array on the yoke 10 and facing the rotor magnet 9. If an electric current is supplied to the drive coils 11, the field magnetic flux created between the rotor magnet 9 and the stator yoke 10 produces torque to cause the rotor 5 to rotate relative to the stator 6.

The turntable 3 has a central hole 12 in which the output shaft 2 of the motor 1 is received, a hole 13 in which a drive pin 19 is received, and eyelets 14 in which pins 18 are received for securing a spring member 17 to the lower side of the turntable 3, as shown in FIG. 6. The turntable 3 also includes a wear-resistant plastic sheet 15 bonded to the center of its upper side around its central hole 12, and a sheet of a magnet 16, such as of rubber, bonded to its upper side outside the area in which the central hole 12, drive pin receiving hole 13 and plastic sheet 15 are provided. The drive pin 19 is secured to the spring member 17, extends through the hole 13 and has a free end 19a projecting above the turntable 3.

The spring member 17 is shown in detail in FIG. 7. It comprises a generally circular sheet of a highly elastic material, such as phosphor bronze. It has a central hole 17a in which a projection provided in the center of the lower side of the turntable 3, but not shown can be tightly fitted to position the spring member 17 relative to the turntable 3. The spring member 17 also has near its outer periphery a plurality of eyelets 17b through which the pins 18 are passed to secure it to the turntable 3. It also has an arcuate slot 17c formed on the diametrically opposite side of the central hole 17a from the eyelets 17b. The slot 17c defines a generally arcuate spring portion 17d having a radially inwardly projecting middle portion 17e to which the drive pin 19 is attached.

The pulse generator 4 comprises a magnet 20 secured to the outer surface of the rotor yoke 8 and a pickup 21 attached to the stator yoke 10 and facing the magnet 20. The pickup 21 detects the magnetic field of the magnet 20 during each rotation of the rotor yoke 8 and thereby the phase of the drive pin 19 having a specific positional relation to the magnet 20.

FIG. 8 shows by way of example a floppy disk which can be rotated by the floppy disk drive hereinabove described. The floppy disk 22 comprises a magnetic disk 23 and a disk cartridge 24 in which the disk 23 is rotatably held. The magnetic disk 23 has at its center a hub 25 formed from a metal sheet. The hub 25 has a central hole 26 in which the upper end 2a of the output shaft 2 projecting above the turntable 3 can be fitted, and a rectangular hole 27 provided radially outwardly of the central hole 26 for receiving the drive pin 19.

If the floppy disk is placed on the turntable 3, the hub 25 is attracted by the magnet sheet 16, and the upper end 2a of the output shaft 2 is passed through the central hole 26. The drive pin 19 is pressed down by the hub 25 into the hole 13 of the turntable 3 against the force of the spring member 17, as shown in FIG. 9(a). If the turntable 3 is rotated in the direction of an arrow A until the drive pin 19 is aligned with the hole 27, the drive pin 19 is urged upward into the hole 27 by the spring member 17, as shown in FIG. 9(b). If the turntable 3 is further rotated, the drive pin 19 abuts on the radially outward edge 27a of the hole 27 and the spring member 17 urges the hub 25, hence the disk 23, in the direction of an arrow B radially outwardly of the output shaft 2, as shown in FIG. 9(c). If the turntable 3 is further rotated, the drive pin 19 abuts on the front edge 27b of the hole 27 to complete the radial and circumferential positioning of the disk 23, as shown in FIG. 9(d).

As the disk 23 is positioned radially relative to the output shaft 2 by the engagement of the drive pin 19 with the outer edge 27a of the hole 27, the disk 23 can always be positioned on a fixed center of rotation and thereby enables its tracking by a recording and playback head not shown. As the disk 22 is positioned circumferentially relative to the drive pin 19 by its engagement with the front edge 27b of the hole 27, and as the circumferential phase of the drive pin 19 is detected by the pulse generator 4, the disk always has a fixed position in which it starts storing or reproducing data.

There is a floppy disk drive of the type generally as hereinabove described, and further featured by the disk drive motor 1 which stops rotation automatically to achieve savings in power consumption when no storing or reproduction of data is done for a certain period of time, while power supply is on. It is often the case with a floppy disk drive of such type that the floppy disk 22 is removed from the turntable 3 when the motor 1 has stopped, and is placed thereon again when the storing or reproduction of data is started again.

This mode of use is, however, likely to present a problem, as will hereinafter be pointed out. If the floppy disk 22 is removed from the turntable 3, the drive pin 19 is disengaged from the outer edge 27a of the hole 27 and urged radially outwardly of the hub 25 by the spring member 17. When the floppy disk 22 is placed on the turntable 3 again, therefore, the drive pin 19 is not in alignment with the hole 27 radially of the hub 25, as shown in FIG. 10(a). As the drive pin 19 has an outer portion 19a located radially outwardly of the outer edge 27a of the hole 27, it is pressed down by the hub. As it also has a front edge 19b which is substantially aligned with the front edge 27b of the hole 27, however, the drive pin 19 is not fully pressed down into the hole 13 of the turntable 3, but has an inner portion 19c projecting into the hole 27, while its front edge 19b engages the front edge 27b of the hole 27, as shown in FIG. 10(b). If the turntable 3 is rotated, therefore, the hub 25 and hence the magnetic disk 23 can be rotated, despite the failure of the drive pin 19 to fit properly in the hole 27. Although the disk 23 can be rotated, however, the recording or playback head fails to track the disk properly to enable the proper storing or reproduction of data, since the disk does not have a correctly positioned axis of rotation.

SUMMARY OF THE INVENTION

It is an object of this invention to provide a floppy disk drive which is free from any of the drawbacks of the prior art as hereinabove pointed out, and which ensures the proper engagement of a drive pin in a hole in a floppy disk to enable a high accuracy of data storing and reproduction.

This object is attained by a device including a spring member which enables a drive pin to incline both radially and circumferentially of a hub on a floppy disk when the floppy disk is placed on a turntable. This feature prevents the drive pin, which is attached to the turntable, from engaging only partly in the hole of the floppy disk when the floppy disk has been placed on the turntable, while a disk drive motor is out of operation, and thereby ensures the proper storing and reproduction of data thereon.

DETAILED DESCRIPTION OF THE INVENTION

Figure 1:
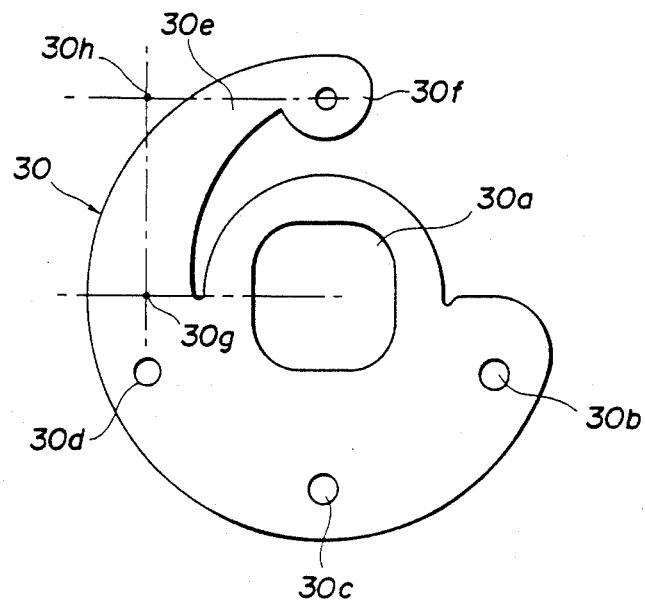
FIG. 1 is a top plan view of a spring member embodying this invention.
Figure 2:
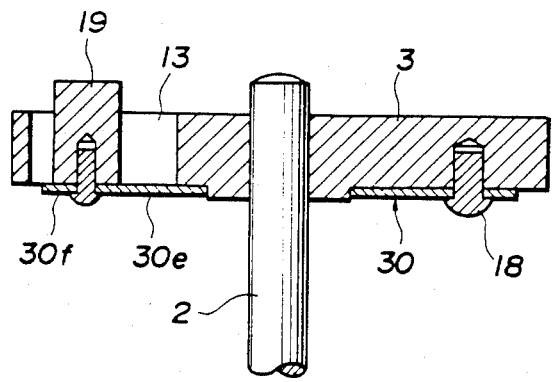
FIG. 2 is an axial sectional view of the turntable to which the spring member of FIG. 1 is attached.

A spring member embodying this invention for use in a floppy disk drive is shown at 30 in FIGS. 1 and 2. The spring member 30 is formed from a sheet of a highly elastic material, such as phosphor bronze. It has a central hole 30a in which a projection 3a depending from the center of the lower surface of a turntable 3 can be tightly fitted. A plurality of holes 30b to 30d are provided in the spring member 30 near its outer periphery in an arcuate array surrounding the central hole 30a. A pin 18 is passed through each of the holes 30b to 30d to secure the spring member 30 to the turntable 3. An arcuate spring portion 30e extends substantially the diametrically opposite side of the central hole 30a from the peripheral holes 30b to 30d. The spring portion 30e has a free end 30f located on the diametrically opposite side of the central hole 30a from the peripheral hole 30c. A disk drive pin 19 is secured to the free end 30f as shown in FIG. 2, and extends through a hole 13 provided in the turntable 3 as already described in connection with the prior art.

Figure 3A:
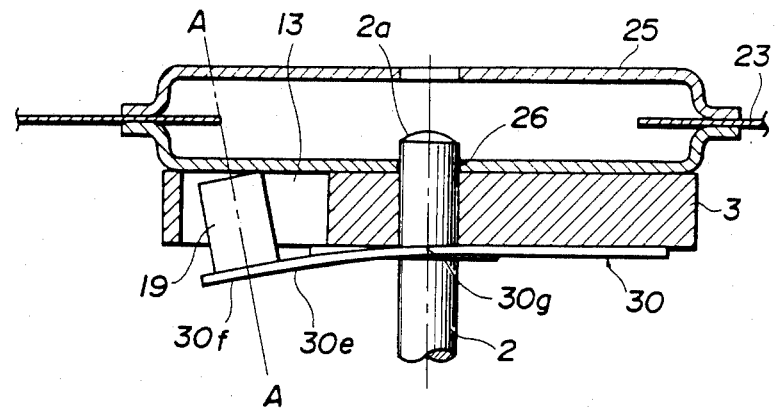
FIGS. 3(a) and 3(b) are side elevational views, partly in section, of the turntable and a floppy disk placed thereon, illustrating the action of the spring member according to this invention.
Figure 3B:
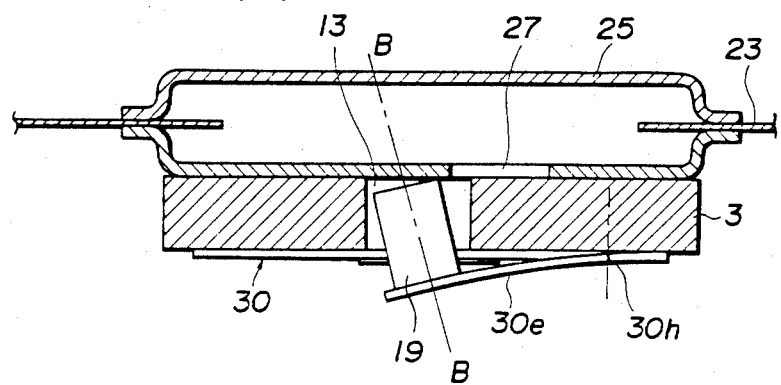
Figure 4:
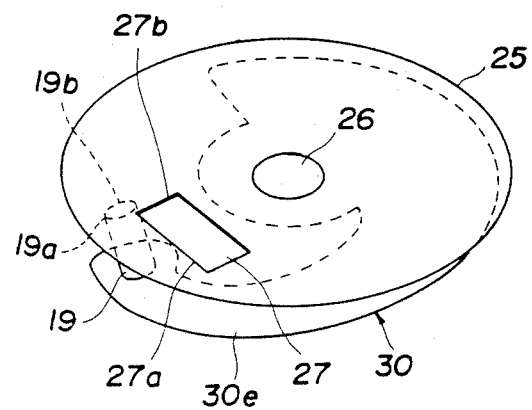
FIG. 4 is a schematic perspective view which explains the action of the spring member according to this invention.
Figure 5:
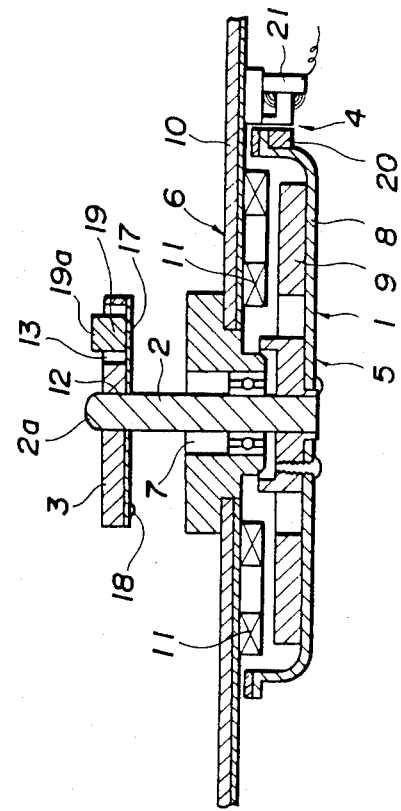
FIG. 5 is a partial longitudinal sectional view of a known floppy disk drive.
Figure 6:
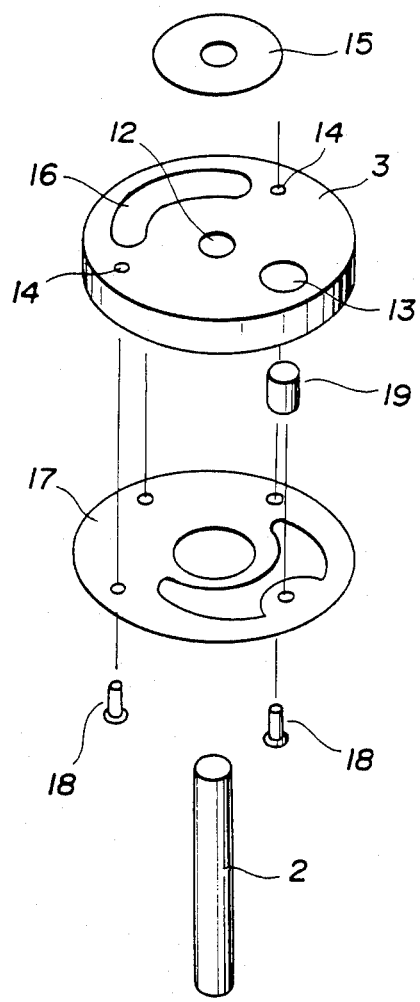
FIG. 6 is an exploded perspective view of the turntable shown in FIG. 5.
Figure 7:
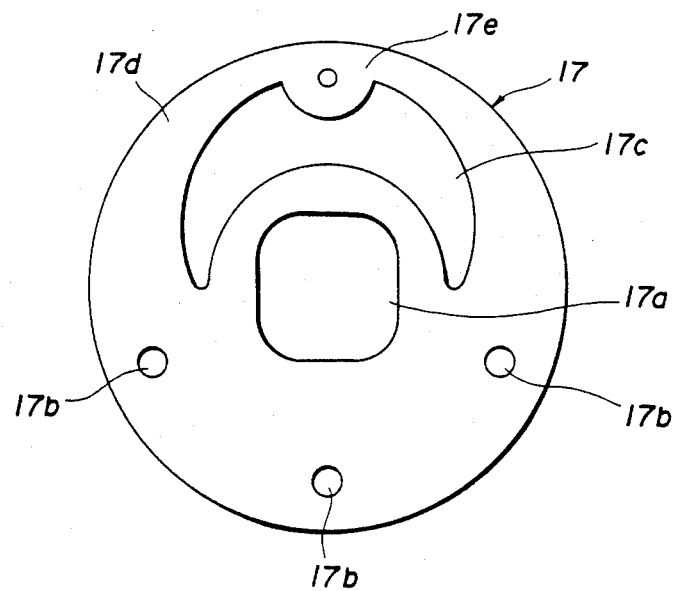
FIG. 7 is a top plan view of the spring member in the floppy disk drive of FIG. 5.
Figure 8:
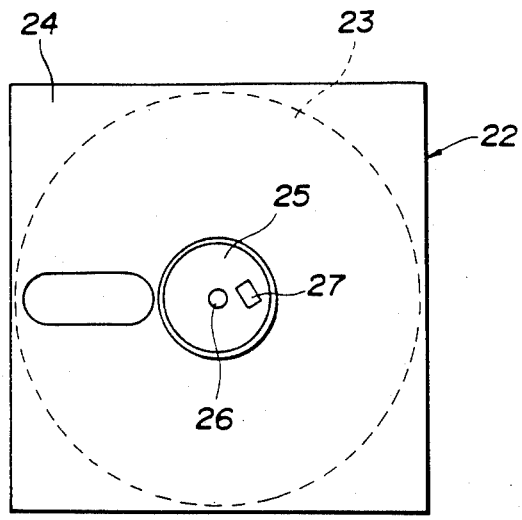
FIG. 8 is a top plan view of a floppy disk.
Figure 9A:
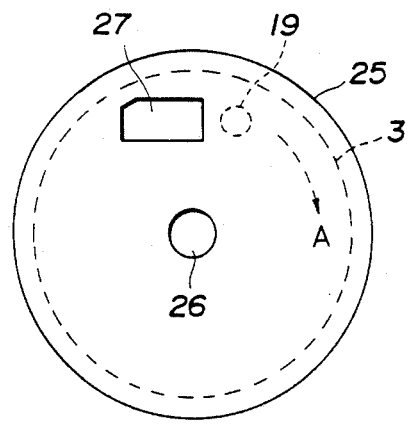
FIGS. 9(a) to 9(d) are a series of top plan views showing the actions of the spring member and the drive pin in the floppy disk drive of FIG. 5.
Figure 9B:
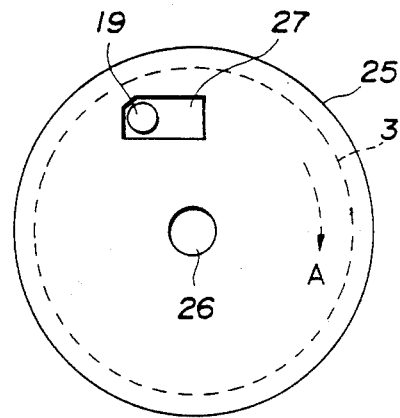
Figure 9C:
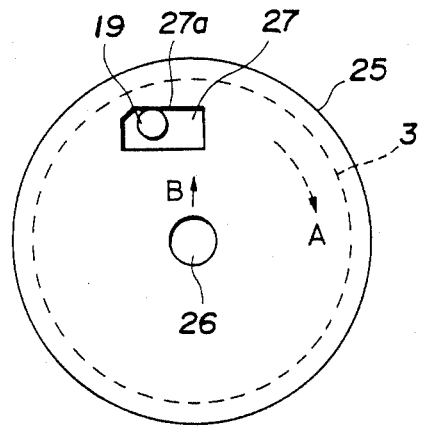
Figure 9D:
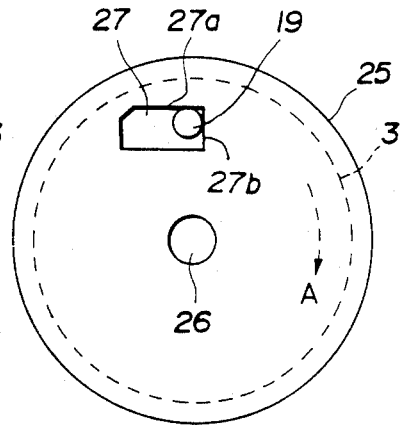
Figure 10A:
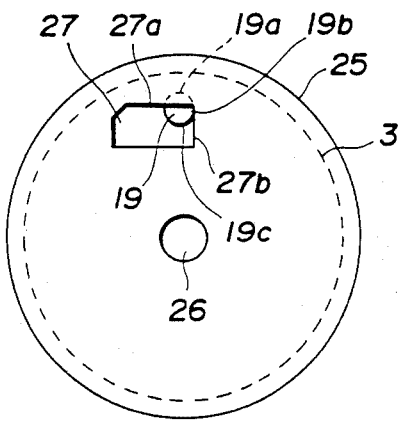
FIGS. 10(a) and 10(b) illustrate the drawbacks of the spring member in the known floppy disk drive.
Figure 10B:
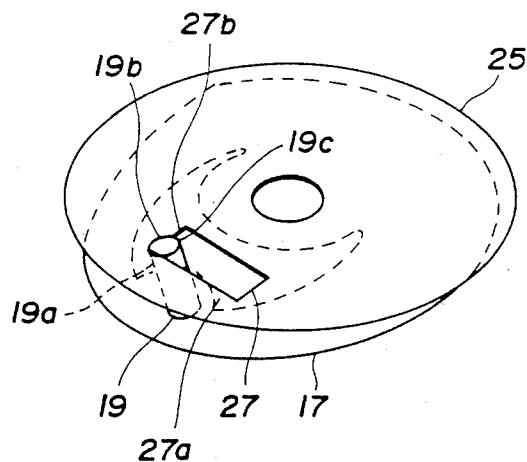

If a floppy disk 22 having a hub 25 is placed on the turntable 3, the drive pin 19 is pressed by the hub 25 and retracted resiliently into the hole 13. As the drive pin 19 is carried on the free end of the arcuately projecting spring portion 30e, the drive pin 19 retracted into the hole 13 is inclined in a direction resultant from the direction in which it is inclined about a point 30g (FIG. 1) of junction between the main body portion of the spring member 30 and its arcuate spring portion 30e, and which is perpendicular to the free end 30f of the spring portion 30e, as shown at A—A in FIG. 3(a), and the direction in which it is inclined about a point 30h (FIG. 1) of arcuate curvature of the spring portion 30e, and which is perpendicular to the free end 30f thereof, as shown at B—B in FIG. 3(b). Therefore, if the floppy disk 22 removed from the truntable 3 when the disk drive motor 1 has stopped is placed again thereon, the drive pin 19 has a radially outer edge portion 19a pressed down by the hub 25 radially outwardly of the outer edge 27a, and a front edge portion 19b pressed down by the hub 25 ahead of the front edge 27b of the hole 27, as shown in FIG. 4. The front edge portion 19b of the drive pin 19 does not engage the front edge 27b of the hole 27, as opposed to the drive pin in the conventional device.

If the turntable 3 is rotated, the drive pin 19 is brought into alignment with the hole 27 and fits therein. The drive pin 19 engages the outer edge 27a of the hole 27 to effect the radial positioning of the disk 22, and its front edge 27b to effect the circumferential positioning of the disk 22, whereupon the disk 22 is rotated.

The magnetic disk 23 is likewise driven for rotation even if the drive pin 19 and the hole 27 of the hub 25 have an entirely different positional relationship to each other, as is usually the case, or even if the floppy disk 22 is placed on the turntable 3 when the motor 1 is rotating.

The spring member in the floppy disk drive according to this invention allows the disk drive pin to incline both radially and circumferentially of the hub of a floppy disk, as hereinabove described. Therefore, the drive pin is correctly positioned in the drive pin receiving hole of the hub during one rotation of the turntable whenever the floppy disk may be placed on the turntable. This ensures the correct positioning of the magnetic disk before its rotation is started, and thereby prevents any tracking failure resulting in defective storing or reproduction of data.

The construction of the spring member as hereinabove described with reference to FIG. 1 does not limit the scope of this invention. A spring member of any other shape may be satisfactory if it allows the drive pin to incline both radially and circumferentially of the hub of a floppy disk when it is pressed down by the hub.

If the drive pin is formed with an appropriately beveled edge at its free end, it is more effective to prevent any undesirable engagement of the drive pin in the drive pin receiving hole before it properly fits therein.

What is claimed is:

1. In a floppy disk drive including a disk drive motor having an output shaft, a turntable secured to said output shaft for rotation therewith about a center axis and having a through hole at one location spaced in a radial direction from the center axis, a spring member attached to a bottom side of said turntable, and a disk drive pin provided on said spring member having an upper end which is biased by said spring to project through said through hole above a top side of said turntable for engaging a drive hole formed in a hub portion of a floppy disk placed on said turntable in order to transmit rotation of said turntable to the disk, the improvement wherein said spring member is formed as a sheet of elastic material having a central hole fitting on a central portion of said turntable, peripheral holes spaced radially from the central hole on one semicircular portion of said sheet for allowing said spring member to be secured by fastening means to said turntable, and a single arcuate spring portion extending from one side of said semicircular portion of said sheet along a circumferential direction to a free end mounting said drive pin at a location opposite from the semicircular portion of said sheet, said drive pin on said free end of said arcuate spring portion thereby being capable of inclining both in the radial direction and in the circumferential direction relative to said center axis of said turntable.

* * * * *